United States Patent
Pinkawa et al.

(10) Patent No.: US 6,896,503 B1
(45) Date of Patent: May 24, 2005

(54) MOULD SEGMENT FOR A VULCANIZATION MOULDING TOOL FOR PNEUMATIC TIRES

(75) Inventors: Hartmut Pinkawa, Neustadt (DE); Dirk Wildhagen, Hannover (DE); Marian Pokoj, Garbsen (DE); Stefan Wist, Seelze (DE); Bernd Dahmen, Herzogenrath (DE)

(73) Assignee: Dahmen GmbH, (DE)

( * ) Notice: Subject to any disclaimer, the term of this patent is extended or adjusted under 35 U.S.C. 154(b) by 74 days.

(21) Appl. No.: 10/416,358

(22) PCT Filed: Jun. 26, 2002

(86) PCT No.: PCT/EP02/07032

§ 371 (c)(1),
(2), (4) Date: May 9, 2003

(87) PCT Pub. No.: WO03/002334

PCT Pub. Date: Jan. 9, 2003

(30) Foreign Application Priority Data

Jun. 28, 2001 (DE) ................................. 101 31 130

(51) Int. Cl.⁷ .................. B29D 30/06; B29C 33/42
(52) U.S. Cl. ........................................ 425/28.1; 425/46
(58) Field of Search .................... 425/28.1, 35, 46, 425/193, 470, 472

(56) References Cited

U.S. PATENT DOCUMENTS

| 2,224,337 | A |   | 12/1940 | Bostwick ................... 29/148.2 |
| 2,732,589 | A | * | 1/1956 | Steadman .................. 425/28.1 |
| 2,736,924 | A | * | 3/1956 | Bean ........................ 425/28.1 |
| 3,553,790 | A |   | 1/1971 | Brobeck et al. |
| 4,553,918 | A | * | 11/1985 | Yoda et al. ................... 425/46 |

FOREIGN PATENT DOCUMENTS

| DE | 11 69 651 |   | 6/1961 |
| DE | 43 41 683 |   | 12/1993 |
| DE | 197 10 400 |   | 3/1997 |
| DE | 197 49 565 |   | 11/1997 |
| DE | 199 13 436 |   | 3/1999 |
| JP | 10-258429 |   | 9/1998 |
| JP | 11-34061 | * | 2/1999 |
| JP | 11-291250 | * | 10/1999 |

* cited by examiner

Primary Examiner—James P. Mackey
(74) Attorney, Agent, or Firm—Kusner & Jaffe

(57) ABSTRACT

The invention relates to a mould segment for a vulcanization moulding tool for pneumatic tires.

15 Claims, 3 Drawing Sheets

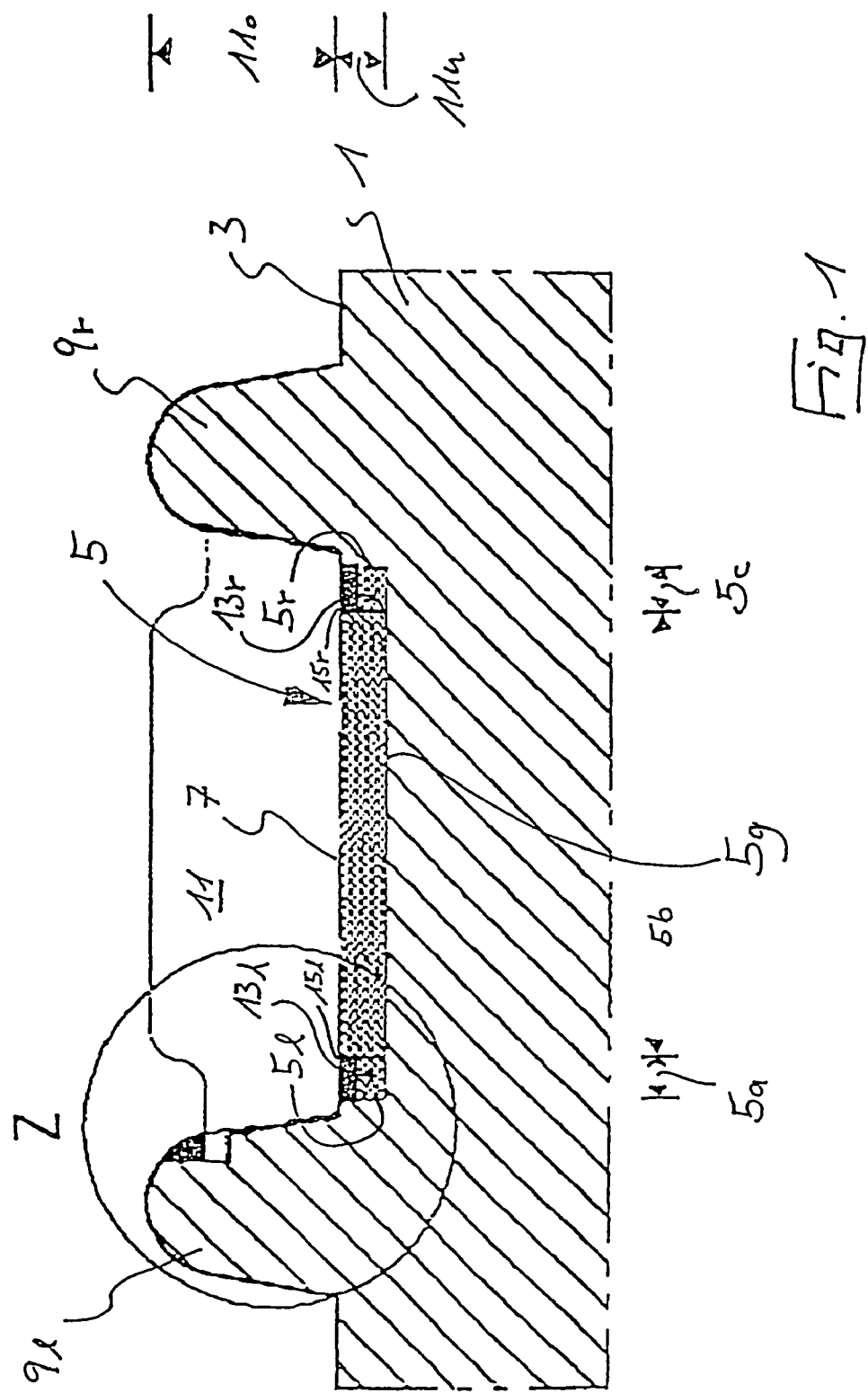

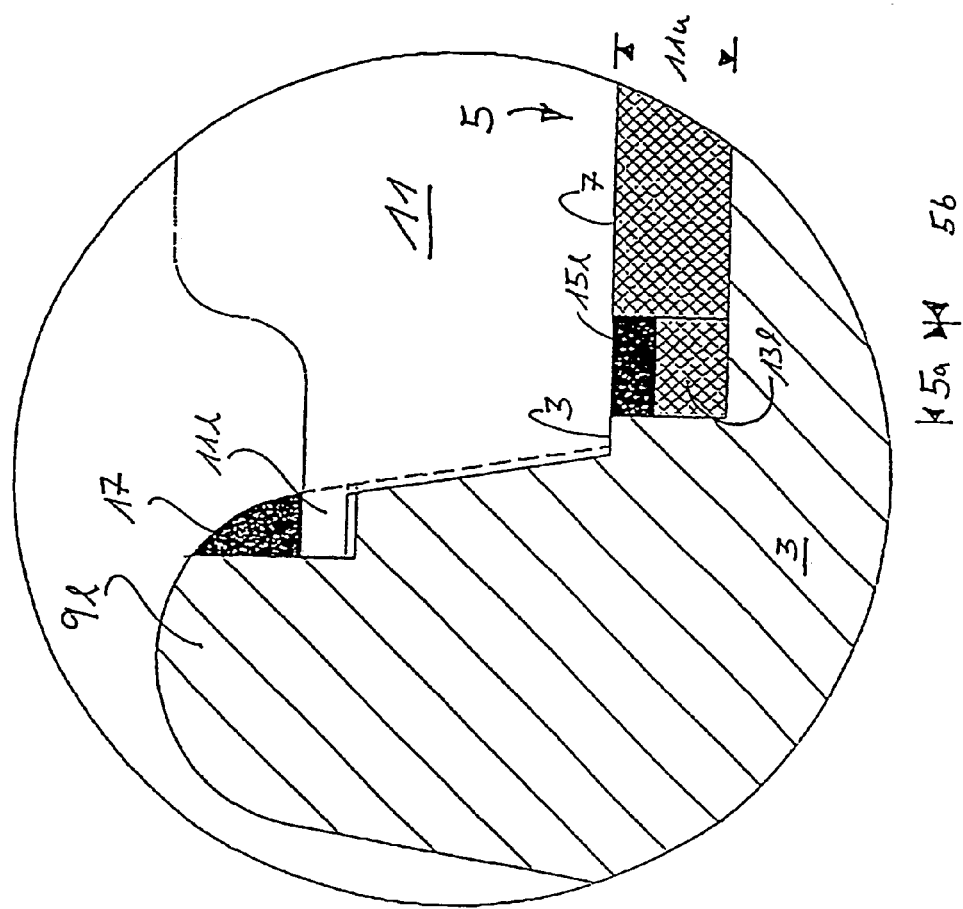

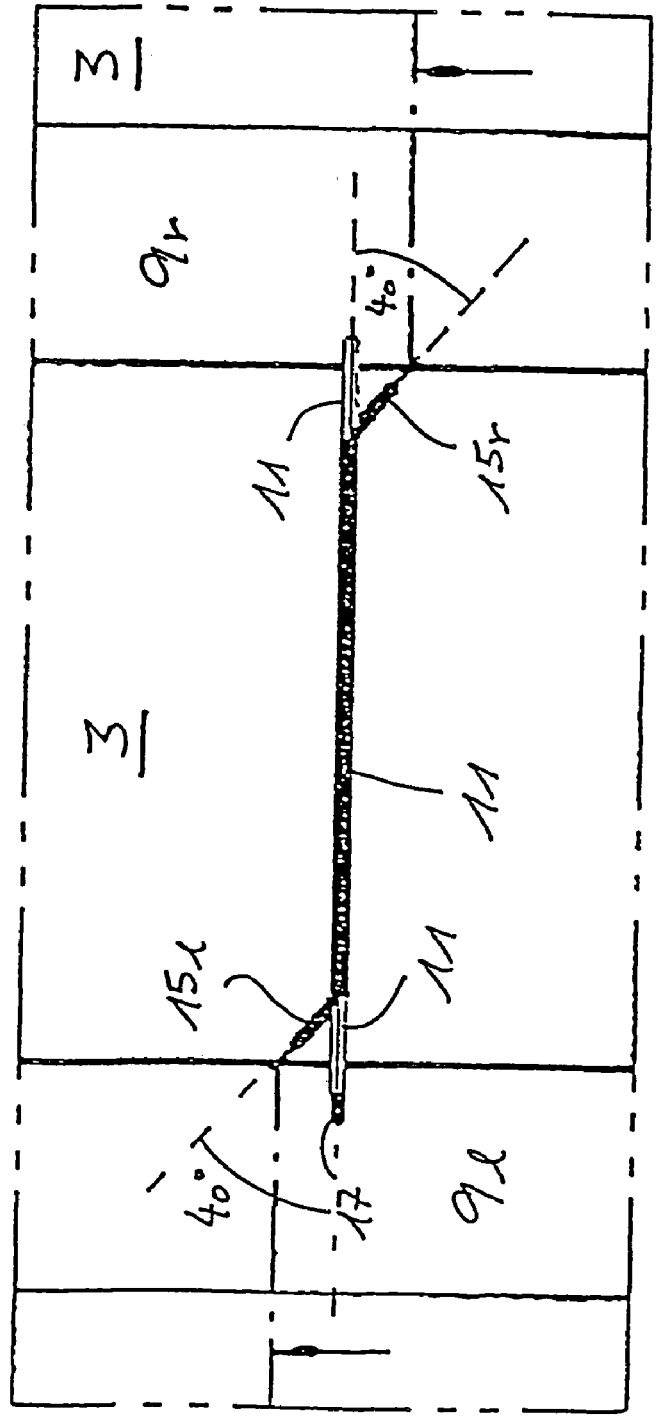

MOULD SEGMENT FOR A VULCANIZATION MOULDING TOOL FOR PNEUMATIC TIRES

The invention relates to a mould segment for a vulcanisation mould for vehicle tyres.

Vehicle tyres usually consist of a vulcanisable material. In order to provide the running surface of a vehicle tyre with a profile tread, devices known as vulcanisation moulds are used. These consist of several segments, also referred to as profile segments. The mould segments feature a mould surface for the profiling of the tyre. In their arrangement to form the vulcanisation mould, the mould surfaces of the mould segments may lie next to one another in such a way that they represent the negative shape of a vehicle tyre which is to be provided with a profile tread. To provide the profile tread on the tyre, the mould surface exhibits different mould parts, such as, for example, mould ribs or lamellae. The (broader) mould ribs are formed monolithically (as one-piece) from the mould surface, or connected to it such as by means of a welding seam. The (narrower) lamellae, in order to establish an adequately firm connection to the mould surface, are placed in a cut-out in the mould surface and secured in it.

To provide a profile tread on a non-profiled vehicle tyre, the tyre is introduced into the vulcanisation mould. The tyre is then subjected to pressure, so that its sections which are turned towards the mould surfaces—the later running surface of the tyre—are pressed against the mould surfaces. With the simultaneous application of heat, these sections of the tyre fit snug against the mould surfaces and the part moulds arranged on them. As a result, the tyre is provided with its profile tread. Once the tyre has been vulcanised, pressure and heat are withdrawn, the mould segments of the vulcanisation mould are parted, and the tyre removed from the vulcanisation mould.

While mould segments were earlier exclusively manufactured by casting, they are today also milled out of a solid block. As the material for the mould segment, aluminium or aluminium alloys are usually used. For mould subjected to particularly high demands, such as for the manufacture of heavy goods vehicle tyres, moulds made of steel are used in part.

A particular problem with the making-up of mould segments for vulcanisation moulds is the securing of the lamellae to the mould surface. Because the lamellae are too narrow to be worked out of the mould surface monolithically, or to be welded to it, they must be anchored in a cut-out in the mould surface. To secure the lamella in the cut-out, it has hitherto as a rule been adhesively bonded into the cut-out with a metal adhesive. Because the strength of the join between the lamella and the wall of the cut-out created by means of a metal adhesive is not particularly high, and because the lamella is subjected to high levels of stress during the vulcanisation of the tyre, the cut-out has hitherto had to be designed deeper, such as 4 mm deep or deeper.

Because the lamellae are usually made of sheet steel, welding the lamellae inserted into the cut-out to a mould segment made of aluminium or an aluminium alloy does not come into consideration.

The width of the cut-out corresponds as a rule to the usual thickness of the lamellae usually used today, of about 0.6 mm.

The formation of a cut-out with a width of only 0.6 mm, with a required depth of the cut-out of at least 4 mm, however, presents a considerable problem. It would be advantageous if it were possible to anchor a lamella securely in a cut-out of only about 2 mm in depth.

In order to achieve a secure mount for a lamella in a tyre mould segment, DE 197 49 565 C1 proposes forming a tyre mould segment with a slot extending from the inner side of the segment into the interior of the segment, and at least one cavity into which the slot opens; a lamella can be introduced into the slot, which can be engaged in the cavity by means of a catch engagement tongue. A slot opening into a cavity can, however, only be created with difficulty, and not at all by means of milling.

The invention is based on the problem of providing a mould segment of a vulcanisation mould for vehicle tyres with lamellae firmly anchored in it, which is simple to manufacture.

In its general embodiment, the invention proposes, to solve this problem, a mould segment of a vulcanisation mould for vehicle tyres with the following features:

A mould surface for the provision of a profile tread of the tyre, with

At least one slot-shaped cut-out;

A lamella for providing the profile tread for the tyre is inserted into at least one of the cut-outs;

The lamella projects over the opening mouth of the cut-out, out of the cut-out;

The lamella exhibits in its section inserted into the cut-out at least one laterally protruding part piece, of which the side turned towards the opening mouth runs at a distance from the opening mouth, whereby Arranged between the side of the part piece turned towards the opening mouth and the opening mouth itself is a fixing element, connected to the side wall of the cut-out.

The invention proceeds accordingly from the consideration of anchoring the lamella in the cut-out by means of at least one part piece protruding laterally from the lamella beneath a fixing element.

This solution has the advantage on the one hand that the cut-out can be formed from the mould surface easily, in particular without rear cuts or interior cavities. Another substantial advantage lies in the fact that a steel lamella can now be anchored (indirectly) by means of a particularly stable and therefore preferred welded joint into cut-out of a mould segment made of aluminium or an aluminium alloy, because the fixing element can be made of the same metal as the mould segment and can therefore be welded to it. In addition to this, it is sufficient for an adequately strong anchoring of the lamella in the cut-out if the cut-out is only 1 to 3 mm deep, i.e. also about 1.5 to 2.5 mm deep.

The lamella can, for example, be made of steel, aluminium, or alloys of these. It can, fore example, be manufactured from a sheet and exhibit main surfaces running essentially flat and parallel to one another. It can exhibit any desired shape, such as, for example, an essentially rectangular or trapezoidal shape. Provision may also be made for a lamella in which the main surfaces are not flat, but which run, for example, zig-zag or curved. The thickness of the lamella can, for example, lie in the range between 0.2 and 1 mm, i.e. for example also between 0.4 and 0.8 mm or between 0.5 and 0.7 mm.

The part piece is arranged on the lamella in such a way that it is sunk fully into the cut-out when the lamella is inserted into the cut-out. The part piece can be formed monolithically from the lamella, and can, for example, be bent out of the lamella. This type of forming is particularly favoured with a lamella manufactured from sheet. Provision may also be made for the part piece to be secured to the lamella, for example by being welded to it.

According to one embodiment, provision may be made for at least one part piece to project laterally from at least one of the narrow sides of the lamella. The term "narrow sides" is understood according to the Application to mean the sides of the lamella which form the narrow side surfaces of the lamella between the two larger main surfaces. Because the narrow sides of the lamella can correspond to the only slight thickness of the lamella, the part pieces on the narrow sides of the lamella can be connected to the lamella over the entire width of the narrow side.

As an alternative, or cumulatively, provision can be made for at least one part piece to project from at least one of the broad sides of the lamella. The term "broad side" is understood according to the Application to mean the two main surfaces of the lamella. In this situation, provision may be made for one or more part pieces to be arranged next to one another on the broad sides in each case. If there is only one part piece on one of the broad sides, it may extend over the entire width of the lamella.

The side of each part piece which is turned towards the opening mouth runs at a distance from the opening mouth of the cut-out. According to the Application, the term "opening mouth" of the cut-out is understood to mean an imaginary geometric surface extending between the upper edges of the cut-out at which it merges into the mould surface.

Provision may be made for the side of at least one part piece turned towards the opening mouth to run essentially parallel to the opening mouth.

In order to anchor the lamella in the cut-out, a fixing element connected to the side wall of the cut-out is arranged between the side of the part piece turned towards the opening mouth and the opening mouth itself. According to the method, in this situation the lamella is first inserted into the cut-out; next, fixing elements are connected above each part piece to the side wall of the cut-out, for example by means of welding.

In order to obtain a firm mounting of the lamella in the cut-out, provision can be made in particular for the outer surfaces of the section of the lamella which is inserted into the cut-out to correspond to the wall of the cut-out, so that the lamella can be inserted with precise fit into the cut-out. The part piece or part pieces at the same time extend in each case as far as the side wall of the cut-out. If at least one part piece of the lamella is then covered by means of a fixing element, the lamella will be securely anchored in the cut-out. The aforementioned embodiment can, for example, be provided for in such a way that the side walls of the cut-out run essentially perpendicular to the mould surface and the base surface of the cut-out runs parallel to the opening mouth of the cut-out. Accordingly, the section of the lamella inserted into the cut-out exhibits essentially parallel flat broad sides and a lower narrow side lying in contact on the base surface of the cut-out, as well as lateral narrow sides lying in contact on the narrower side walls; at the broad side or narrow side which a part piece exhibits, the part piece extends as far as the side wall of the cut-out turned towards the side of the lamella which is concerned.

The side of a fixing element which is turned towards the part piece in each case can be arranged directly on the upper side of the part piece, in order prevent the lamella from slipping. The fixing element can in this situation extend over the entire length between the upper side of the part piece and the opening mouth.

The side of the fixing element turned away from the part piece may run at least in sections in the plane of the opening mouth. This allows the fixing element to merge harmoniously and smoothly into the mould surface.

The fixing element can for example be a wire, made of aluminium, steel, or alloys. As already indicated heretofore, if a wire is used which is made of an aluminium material, it is therefore possible for the first time for a steel lamella to be retained in a mould segment made of an aluminium material corresponding to the wire by means of a weld connection.

The mould segment can be made, for example, of aluminium, steel, or alloys thereof.

The mould surface of the mould segment may exhibit the usual concave shape. For the profiling of the tyre, in addition to the minimum of one lamella, it may also exhibit other mould parts, such as, for example, mould ribs.

The cut-out for accommodating the lamella can be machined out of the mould surface by milling or by means of lasers. With a mould segment made of steel, the cut-out can also be introduced into the mould surface by means of erosion countersinking.

It is also possible for the mould segment to be manufactured by means of a laser-sintering process. In this situation, the segment is built up layer by layer by sintering layers of a metal powder by means of laser beams. The mould segment can also be produced by laser building-up welding, in which powder melted in the laser beam is applied in seams. With these two methods of manufacture referred to, the cut-out is already produced together with the mould segment when the segment itself is manufactured.

The cut-out can in principle exhibit any desired shape, but in particular a groove shape. Provision can be made for its walls to correspond with the section of the lamella which is inserted into it, in such a way that the lamella comes into contact with precise fit in the cut-out. In particular with the use of lamellae made of a sheet material, the lamella can be designed in the form of a groove. The groove-shaped cut-out may exhibit at least one folded section. These folded sections can serve to accommodate part pieces arranged at the narrow sides of the lamella. The angle at which the folded section of the groove-shaped cut-out folds out of the longitudinal axis of the groove may be, for example, between 10° and 90°, i.e. also between 20° and 60° or 30° and 50°. An embodiment example with a fold angle of 40° is explained by way of example in the figure description.

According to one embodiment, provision can be made for one of the side walls of the cut-out to exhibit a depression. In this situation the lamella exhibits, on the side surface turned towards this depression, a projection which can be introduced into the depression, and a part piece on the opposite side surface. In this embodiment the lamella is initially inserted into the cut-out in such a way that the projection is introduced into the depression; the part piece is then covered by the guide element.

Other features of the invention are derived from the sub-claims and from the other application documents.

In principle, all the features disclosed in the application documents can be combined in any desired manner.

A highly diagrammatic embodiment is explained on the basis of the following figure description.

The figures show:

FIG. 1: A section from a lateral sectional view of a mould segment;

FIG. 2: The enlarged section Z from FIG. 1; and

FIG. 3: The section according to FIG. 1 from above, i.e. a plan view of the mould surface.

FIG. 1 shows a section from a lateral sectional view of a mould segment 1 made of an aluminium alloy. The section is drawn perpendicular to the mould surface 3 of the mould segment; because in FIG. 1 only a small section from the mould segment 1 is represented, and therefore only a small section of the mould surface 3, the mould surface 3 is represented as flat, although in reality it is curved in slightly concave fashion.

The mould surface 3 exhibits a groove-shaped cut-out 5. The narrower side walls 5l on the left and 5r on the right flank of the cut-out 5 drop away with an inclination to the base surface 5g of the cut-out 5. The two side walls on the broader flanks of the cut-out 5 run between these side walls 5l, 5r, parallel to one other in each case and in their middle section 5b parallel to the plane of the drawing. In their left section 5a they run at an angle of 40° away from the plane of the drawing and in their right section 5b at an angle of 40° onto the plane of the drawing (see FIG. 3). Between the upper edges of the cut-out 5, at which it merges into the mould surface 3— in FIG. 1 only the upper edges of the side walls 5l and 5r can be identified— extends the imaginary geometric surface of the opening mouth 7 of the cut-out 5.

The base surface 5g of the cut-out 5 runs perpendicular to the plane of the drawing and parallel to the opening mouth 7.

Immediately adjacent to the cut-out 5, to the left of it, is a mould rib 9l and to the right of it a mould rib 9r, arranged in each case on the mould surface 3. The mould ribs 9l, 9r are formed monolithically out of the mould surface 3 and run perpendicular to the plane of the drawing.

A lamella 11 made of sheet steel is inserted into the cut-out 5 with its lower section 11u. The upper section 11o projects out of the cut-out 5 above the cut-out opening mouth 7. The middle area of the section 11u is slightly raised. The upper edge of this middle area runs parallel to the opening mouth 7 and lies in one plane with the burrs of the mould ribs 9l, 9r, turned away from the mould surface 3. The section 11u is located precisely positioned in the cut-out 5. The area of the section 11u inserted in the middle section 5b fills this section 5b completely. As FIG. 1 illustrates by means of hatching, it is bonded by a metal adhesive to the side walls of the broader flanks of the cut-out 5.

Located laterally are two part pieces 13l, 13r of the section 11u of the lamella 11. Located in the section 5a is the left-hand part piece 13l and in the section 5c the right-hand part piece 13r. The part pieces 13l, 13r are formed monolithically out of the section 11u of the lamella. The left-hand part piece 13l is folded by 40° away from the plane of the drawing and the right-hand part piece 13r by 40° towards the plane of the drawing; the part pieces accordingly follow the course of the folded sections 5a, 5c of the cut-out 5. The part pieces 13l, 13r in each case fill somewhat more than the lower half of the sections 5a, 5c. They are, represented in turn by hatching, adhesively bonded to the side walls of the cut-out 5 by means of a metal adhesive.

The area designated as Z in FIG. 1 is represented enlarged in FIG. 2.

The upper area of the section 5a, which is not filled by the part piece 13l, is filled by a left-hand fixing element 15l. It occupies the entire space between the side of the part piece 13l, turned towards the opening mouth 7, and the opening mouth 7 itself. The fixing element 15l consists of an aluminium alloy which corresponds to that of the mould segment; it is welded to the side wall of the cut-out 5.

The left-hand edge of the lamella 11 is snug against the flank of the mould rib 9l turned towards the cut-out 5. At its upper end the left-hand edge of the lamella 11 exhibits a web 111, projecting to the left, which is located with precise fit in a cut-out of the flank of the mould rib 9l. The entire space of the cut-out above the web 111 is taken up by an aluminium element 17 which is welded into the cut-out, so that the web 111 is connected securely to the cut-out.

By analogy to the left-hand part piece 13l, the right-hand part piece 13r is covered by a right-hand fixing element 15r in the cut-out 5.

FIG. 3 shows the low thickness of the lamella 11. The middle section 5b of the cut-out, taken up by the lamella 11, is shown in black. The sections 5a, 5c fold, as described heretofore, in different directions from the middle section 5b, so that the cut-out 5 overall exhibits the course of an S-rune.

The method for the production of the mould segment represented is as follows:

The preform or blank of the mould segment 3, including the mould ribs 9l, 9r are machined out of a solid block of aluminium alloy by means of milling. The groove-shaped cut-out 5 is then worked into the blank by means of lasers. The lamella 11 is then inserted with its lower section 11u into the cut-out 5, into which metal adhesive has been introduced beforehand. A wire is laid in each case into the remaining space above the part pieces 13l, 13r inside the sections 5a, 5c, this wire corresponding in its composition to the material of the preform or blank. The wires are welded to the side wall of the cut-out 5, so that the lamella 11 is anchored securely in the cut-out 5.

What is claimed is:

1. A mould segment of a vulcanisation mould for vehicle tyres with the following features:
   a) A mould surface for creating the profile tread of the tyre with
   b) at least one groove-shaped cut-out;
   c) A lamella for creating the profile tread of the tyre is inserted into at least one of the cut-outs;
   d) The lamella projects out of the cut-out, over the opening mouth of the cut-out;
   e) The lamella exhibits in its section inserted into the cut-out at least one laterally projecting part piece,
   f) A side of the part piece, turned towards the opening mouth is spaced from the opening mouth, whereby
   g) arranged between the side of the part piece turned towards the opening mouth and the opening mouth itself is a fixing element connected to the side wall of the cut-out, said fixing element being made of wire.

2. The mould segment according to claim 1 with said mould surface being essentially curved in concave fashion.

3. The mould segment according to claim 1, in which the mould surface exhibits mould parts for creating the profile tread of the tyre.

4. The mould segment according to claim 1, with at least one section of the cut-out bent on the end side.

5. The mould segment according to claim 1, with side walls of the cut-out running essentially perpendicular to the mould surface.

6. The mould segment according to claim 1, with which the side of the part piece turned towards the opening mouth runs essentially parallel to the opening mouth.

7. The mould segment according to claim 1, with which the lamella and part piece are formed monolithically.

8. The mould segment according to claim 7, with which the part piece is curved out of the lamella.

9. The mould segment according to claim 1, with which the fixing element is welded to the side wall of the cut-out.

10. The mould segment according to claim 1, with which the fixing element extends over the length between the upper side of the part piece and the opening mouth.

11. The mould segment according to claim 1, with which a side of the fixing element facing away from the part piece runs at least in sections in the plane of the opening mouth.

12. The mould segment according to claim 1, wherein said fixing element is made of a material which is capable of being welded to the side wall of the cut-out.

13. The mould segment according to claim 1, in which said lamella has two broad sides as main surfaces and two narrow sides between said two broad sides.

14. The mould segment according to claim 13, with said part piece projecting from at least one of the broad sides of the lamella.

15. The mould segment according to claim 13, with said part piece projecting from at least one of the narrow sides of the lamella.

* * * * *